United States Patent
Lee et al.

(10) Patent No.: US 6,558,119 B2
(45) Date of Patent: May 6, 2003

(54) TURBINE AIRFOIL WITH SEPARATELY FORMED TIP AND METHOD FOR MANUFACTURE AND REPAIR THEREOF

(75) Inventors: Ching-Pang Lee, Cincinnati, OH (US); Jonathan James Stow, Hamilton, OH (US); John Peter Heyward, Loveland, OH (US); John Howard Starkweather, Cincinnati, OH (US); Lawrence Joseph Roedl, West Chester, OH (US); Joseph Howell Bowden, Jr., Mason, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/867,213

(22) Filed: May 29, 2001

(65) Prior Publication Data

US 2002/0187042 A1 Dec. 12, 2002

(51) Int. Cl.⁷ ............................................. F04D 29/58
(52) U.S. Cl. .................................................... 416/97 R
(58) Field of Search ............................. 416/97 R, 228; 415/173.1, 173.4, 174.4

(56) References Cited

U.S. PATENT DOCUMENTS

| | | | |
|---|---|---|---|
| 3,615,376 A | | 10/1971 | Ross |
| 3,899,267 A | | 8/1975 | Dennis et al. |
| 4,214,355 A | | 7/1980 | Zelahy |
| 4,247,254 A | | 1/1981 | Zelahy |
| 4,390,320 A | * | 6/1983 | Eiswerth ................. 416/97 R |
| 4,411,597 A | | 10/1983 | Koffel et al. |
| 4,487,550 A | | 12/1984 | Horvath et al. |
| 4,540,339 A | | 9/1985 | Horvath |
| 5,071,054 A | | 12/1991 | Dzugan et al. |
| 5,154,884 A | | 10/1992 | Wukusick et al. |
| 5,173,255 A | | 12/1992 | Ross et al. |
| 5,183,385 A | | 2/1993 | Lee et al. |
| 5,261,789 A | | 11/1993 | Butts et al. |
| 5,348,446 A | | 9/1994 | Lee et al. |
| 5,503,527 A | | 4/1996 | Lee et al. |
| 5,584,663 A | * | 12/1996 | Schell et al. ............ 416/241 R |
| 5,660,523 A | | 8/1997 | Lee |
| 5,673,745 A | * | 10/1997 | Jackson et al. ................ 164/80 |
| 5,733,102 A | | 3/1998 | Lee et al. |
| 5,738,491 A | * | 4/1998 | Lee et al. .................... 415/177 |
| 5,743,322 A | * | 4/1998 | Jackson et al. ................ 164/98 |
| 5,794,338 A | * | 8/1998 | Bowden, Jr. et al. ...... 29/889.1 |
| 5,822,852 A | | 10/1998 | Bewlay et al. |
| 5,846,057 A | * | 12/1998 | Ferrigno et al. ......... 416/241 R |
| 5,937,946 A | * | 8/1999 | Streetman .................... 166/267 |
| 6,074,602 A | * | 6/2000 | Wukusick et al. .......... 420/443 |
| 6,231,307 B1 | * | 5/2001 | Correia ...................... 416/97 R |
| 6,299,971 B1 | * | 10/2001 | Maloney ................... 428/312.8 |
| 6,344,382 B1 | * | 2/2002 | Wu et al. .................... 438/303 |

OTHER PUBLICATIONS

Declaration of Pre–Critical Date Activity.

* cited by examiner

*Primary Examiner*—Edward K. Look
*Assistant Examiner*—James M McAleenan
(74) *Attorney, Agent, or Firm*—Scott, Addis Senniger, Powers, Leavitt & Roedel

(57) ABSTRACT

An airfoil for a gas turbine engine, the airfoil having a core body with an airfoil body, an integral partial height squealer tip, and an integral tip cap between the airfoil body and the integral partial height squealer tip; and a squealer tip extension bonded to the partial height squealer tip. A method for manufacture and repair of an airfoil.

22 Claims, 3 Drawing Sheets

TURBINE AIRFOIL WITH SEPARATELY FORMED TIP AND METHOD FOR MANUFACTURE AND REPAIR THEREOF

BACKGROUND OF THE INVENTION

This invention relates to airfoils for gas turbine engines having an airfoil body and a separately formed airfoil tip and, more particularly, to airfoils with cast-in tip caps, airfoils with impingement cooled squealer tips, bimetallic airfoils, and methods for making and repairing airfoils.

Airfoils in gas turbine engines experience durability problems at the tip of the airfoil in the form of cracking due to thermal induced stress and material loss due to oxidation. This can be addressed by using an alloy having increased resistance to environmental oxidation and corrosion. However, it is undesirable to upgrade the entire airfoil to a more thermal-resistant and oxidation-resistant alloy because this increases component cost and perhaps weight.

Bowden, Jr. et al., U.S. Pat. No. 5,794,338 discloses a blade originally manufactured with a one-piece body of a single superalloy which is removed from service after being damaged. The blade tip is repaired by removing damaged alloy material and replacing it with a different alloy more resistant to environmental oxidation.

Lee et al., U.S. Pat. No. 5,348,446 discloses an airfoil having a core body of a first alloy and a U-shaped blade tip of a second alloy bonded to a flat roof of the core body.

Tip wear has also been addressed by increasing cooling efficiency at the tip. Various cooling arrangements are disclosed in Lee et al. U.S. Pat. No. 5,183,385, including impingement cooling of the squealer tip via angled impingement cooling holes in a brazed on tip cap as shown in FIG. 3. Dennis et al., U.S. Pat. No. 3,899,267 discloses an alternative impingement cooling arrangement.

BRIEF SUMMARY OF THE INVENTION

Briefly, therefore, the invention is directed to an airfoil having a one-piece core body having, upon original manufacture, an airfoil body, an integral partial height squealer tip, an integral tip cap between the airfoil body and the integral partial height squealer tip, and a squealer tip extension bonded to the partial height squealer tip.

The invention is also directed to an airfoil having a one-piece core body formed from a first superalloy comprising, upon original manufacture, an airfoil body, and an integral tip cap. There is also a squealer tip bonded to the core body upon original manufacture and having at least a portion thereof formed from a second superalloy distinct from the first superalloy. The second superalloy comprises, by approximate weight percent, 0.1 to 0.15 C, 6.0 to 7.0 Cr, 0.01 to 0.02 B, 5.5 to 6.5 Al, 2.5 to 3.5 Re, 4.5 to 5.5 W, 1 to 2 Mo, 11 to 13 Co, 6 to 7 Ta, 1 to 2 Hf, and the balance Ni.

In another aspect the invention is an airfoil comprising a one-piece core body having an airfoil body, an integral partial height squealer tip, and an integral tip cap between the airfoil body and the integral partial height squealer tip. There is a squealer tip extension bonded to the partial height squealer tip, coolant holes in the integral tip cap which holes are angled to direct coolant toward the squealer tip extension.

The invention is further directed to an airfoil manufactured by forming a one-piece core body comprising an airfoil body, an integral partial height squealer tip, and an integral tip cap between the airfoil body and the integral partial height squealer tip; by bonding a squealer tip extension to the partial height squealer tip; and by drilling a coolant hole in the tip cap which coolant hole is angled to direct coolant at the squealer tip extension.

In another aspect the invention is an airfoil of the type having an airfoil body, a tip cap, and a squealer tip, which airfoil is repaired by removing at least a portion of the squealer tip, drilling an impingement coolant hole in the tip cap which coolant hole is angled so as to provide impingement cooling, and replacing the at least a portion of the squealer tip.

The invention is also a method for manufacturing a gas turbine engine airfoil of the type having an airfoil body, a tip cap having a film coolant hole therein, and a squealer tip. The method is forming a one-piece core body comprising an airfoil body, an integral partial height squealer tip, and an integral tip cap between the airfoil body and the integral partial height squealer tip; and bonding a squealer tip extension to the partial height squealer tip.

The invention is additionally directed to a method for repairing a gas turbine engine airfoil of the type having an airfoil body, a tip cap, and a squealer tip. The method involves removing at least a portion of the squealer tip, drilling an impingement coolant hole in the tip cap which coolant hole is angled so as to provide impingement cooling, replacing the at least a portion of the squealer tip.

Other aspects will be in part apparent and in part pointed out hereinafter.

DETAILED DESCRIPTION OF THE INVENTION

Figure 1:
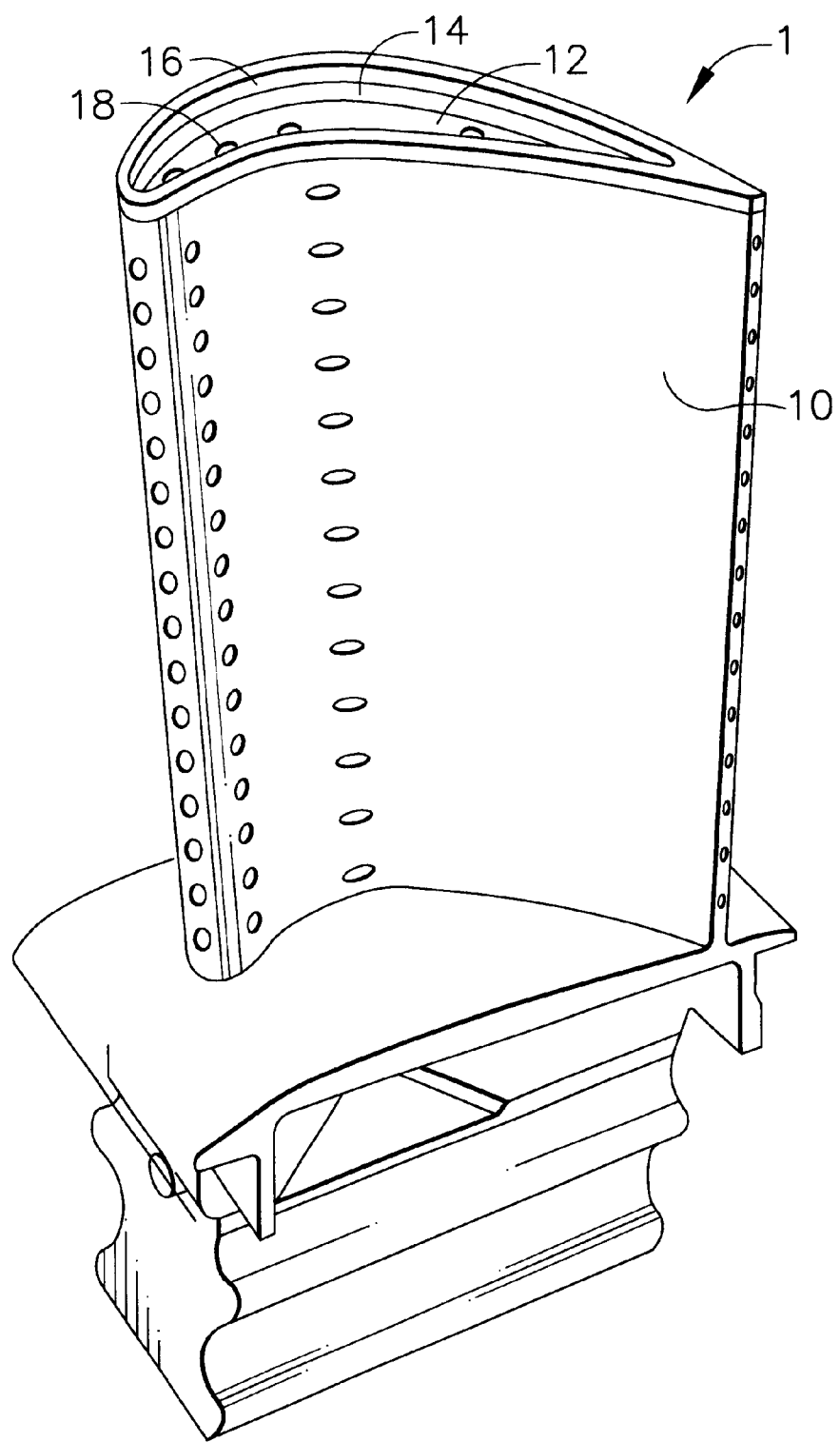
FIG. 1 is a perspective view of a gas turbine engine airfoil.
Figure 2:
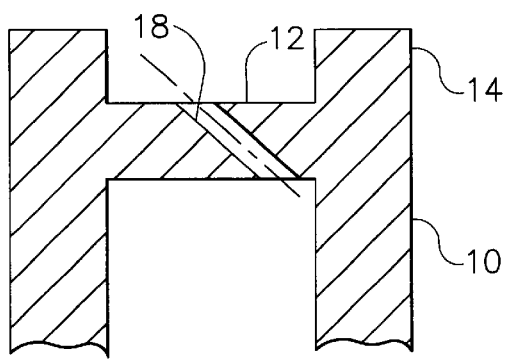
FIG. 2 is a schematic sectional view of a partially manufactured gas turbine engine airfoil.
Figure 3:
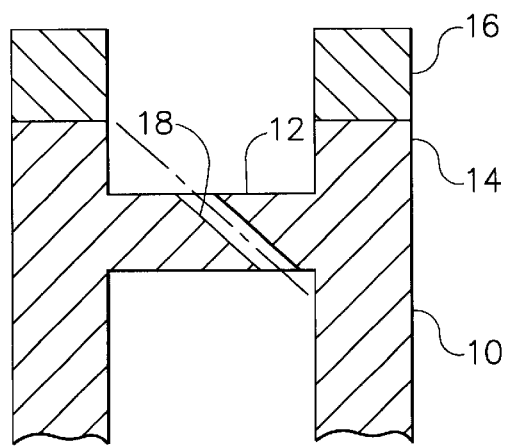
FIGS. 3 and 4 are schematic sectional views of a gas turbine engine airfoils.

The invention as shown in FIGS. 1, 2 and 3 comprises an airfoil 1 having a core body which includes an airfoil body 10, integral cast-in tip cap 12, and an integral partial height cast-in squealer tip 14 (squealer tip portion). There is also a squealer tip extension 16 which extends upwardly from the cast-in squealer tip.

In manufacturing the airfoil, an airfoil body 10, tip cap 12, and partial height squealer tip 14 are integrally formed in a single casting as shown in FIG. 2. These form a one-piece core body having an airfoil body, an integral partial height squealer tip, and an integral tip cap between the partial height squealer tip and the airfoil body. Impingement cooling holes 18 are then drilled as by laser drilling or other method into the tip cap 12. The coolant holes are at an angle so as to be directed above the termination of the partial-height squealer tip 14 as shown by dashed line in FIGS. 2 and 3. The impingement coolant holes provided enhanced cooling.

A squealer tip extension 16 is bonded to the partial height squealer tip 14 as shown in FIG. 3. The extension may be weld build up or may be a separate casting which is attached by welding, diffusion bonding, or other technique. The squealer tip extension extends only upwardly, as distinguished from the U-shaped component in, e.g., Horvath, U.S. Pat. No. 4,540,339, which lays over the cast-in tip cap in that patent. An advantage to the current configuration versus the '339 configuration is that the current configuration weighs less, because it does not have the effective double tip cap of the '339 configuration.

Figure 5:
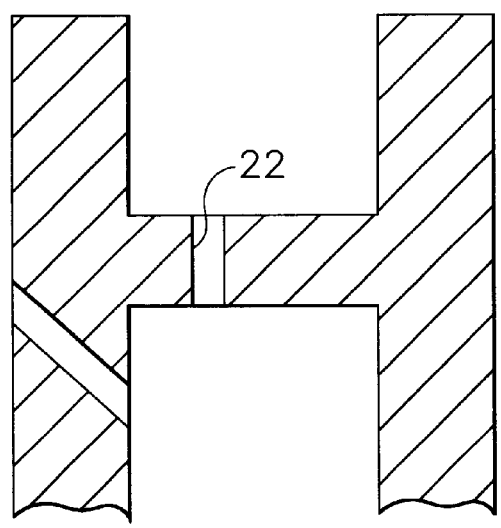
FIG. 5 is a prior art airfoil shown schematically and in section.

One of the advantages of the invention is especially apparent when comparing FIGS. 2 and 3 to prior art FIG. 5. In FIG. 5, where the full length of the squealer tip is cast integrally with the tip cap and the core body, it is evident that angle impingement coolant holes cannot be drilled into the tip cap because the full height of the squealer tip interferes with the line of sight for drilling coolant holes. By having a partial height squealer tip cast-in rather than a full height squealer tip, there is a line of sight for drilling angled impingement coolant holes, as shown by the dashed line in FIG. 2. The technical effect of this is that efficient impingement cooling is imparted to the tip. Furthermore, there is flexibility to form the squealer tip extension 16 from the same alloy as the rest of the blade, or from a different alloy.

A feature of this invention is that the tip cap is cast-in rather than brazed-on. By casting the tip cap in the body, the further manufacturing operation of brazing as well as brazing surface preparation is avoided. Also, a further joint and its corresponding durability problems are avoided. The invention here of a partial height squealer tip and a separate tip extension advantageously has the technical effect of facilitating the incorporation of the brazed-on tip cap advantage of permitting angled impingement cooling holes into a design which does not have the drawbacks of a brazed-on tip cap.

One aspect of this invention is the manufacture of at least a portion of the squealer tip from an alloy (a second superalloy) having enhanced resistance to the more extremely oxidative and corrosive conditions encountered by the airfoil tip, relative to the resistance of the alloy (a first superalloy) from which the core body is formed. Examples of advantageous combinations are as follows (nominal composition):

| Combination 1 | | | |
|---|---|---|---|
| Body (Rene' 125) | | Tip (Rene' 142) | |
| C | 0.1 | C | 0.1–0.15 |
| Cr | 9 | Cr | 6.0–7.0 |
| Ti | 2.5 | Ti | <1 |
| B | 0.01 | B | 0.01–0.02 |
| Al | 4.8 | Al | 5.5–6.5 |
| | | Re | 2.5–3.5 |
| W | 7 | W | 4.5–5.5 |
| Mo | 2.5 | Mo | 1–2 |
| Co | 10 | Co | 11–13 |
| Zr | 0.05 | Zr | 0–0.03 |
| | | Cb | 0–0.5 |
| | | Y | 0–0.5 |
| Ta | 3.5 | Ta | 6–7 |
| Hf | 1.5 | Hf | 1–2 |
| | | V | <1 |
| Ni | Balance | Ni | Balance |
| Combination 2 | | | |
| Body (Rene' 80) | | Tip (Rene' 142) | |
| C | 0.15–0.2 | C | 0.1–0.15 |
| Cr | 13.5–14.5 | Cr | 6.0–7.0 |
| Ti | 4.5–5.5 | Ti | <1 |
| B | 0.01–0.02 | B | 0.01–0.02 |
| Al | 2.5–3.5 | Al | 5.5–6.5 |
| Ti:Al | 1:1–2:1 | | |
| | | Re | 2.5–3.5 |
| W | 3.5–4.5 | W | 4.5–5.5 |
| Mo | 3.5–4.5 | Mo | 1–2 |
| Co | 7.5–12.5 | Co | 11–13 |
| | | Ta | 6–7 |
| | | Hf | 1–2 |

-continued

| | | | |
|---|---|---|---|
| Zr | 0.005–0.1 | Zr | 0–0.03 |
| | | Cb | 0–0.5 |
| | | y | 0–0.5 |
| Ni | Balance | Ni | Balance |

"Rene'" is a registered trademark owned by Teledyne Industries, Inc. of Los Angeles, California, USA.

Figure 6:
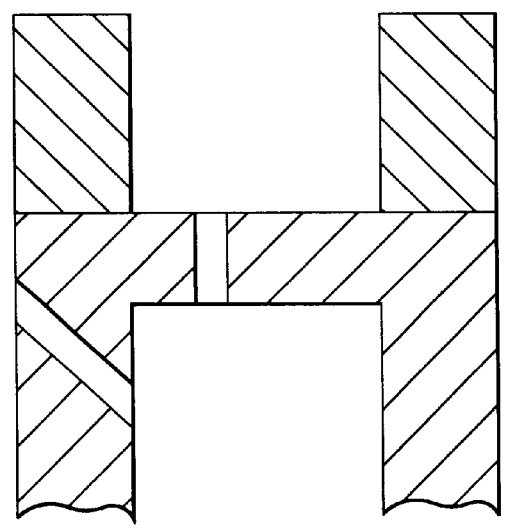
FIG. 6 is a prior art airfoil after a repair operation, shown schematically and in section.

It has been known to repair damaged blades as shown in FIGS. 5 and 6 by removing all or a portion of a squealer tip and replacing it with a tip of a second alloy more resistant to oxidation and corrosion. However, there are significant advantages to incorporating this second superalloy into the tip of the airfoil upon original manufacture, as opposed to upon repair as shown in FIGS. 5 and 6, or as described in U.S. Pat. No. 5,749,338. In particular, the technical effect of this increase in tip durability upon original manufacture is a reduction in the number of cracks during operation. This increases the repair yield, and reduces the number of components which are irreparably damaged in their first service tour after original manufacture. Also, because oxidative and corrosive deterioration are reduced, tip clearance due to oxidation will be reduced, which results in increased service time between engine removals due to performance degradation attributable to tip clearance.

A further advantage to manufacturing the tip from a second superalloy is that, as compared to modifying the alloy of the entire airfoil, modifying only the tip alloy results in much less of a weight change, thus minimizing or eliminating concerns about how weight changes affect vibration frequencies or the disk life.

Figure 4:
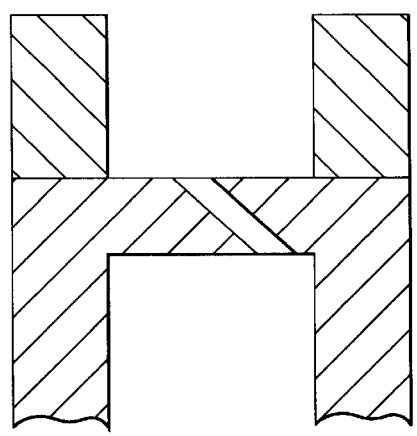

The invention is shown in FIGS. 2 and 3 with a partial height, for example, roughly half as shown in this particular embodiment, of the squealer tip height formed from the same alloy as the airfoil body and only an extension on the squealer tip formed from a different alloy. In the embodiment shown in FIG. 4, the portion of the squealer tip formed from the second alloy is much greater than half, with as much as the entirety of the squealer tip above the tip cap formed from the second alloy.

In one embodiment the invention involves repairing a blade originally manufactured with a film-cooled tip cap. A portion or all of the squealer tip is removed. The film cooling holes in the tip cap, which are parallel to the major dimension of the airfoil, like the tip cap hole 22 in FIG. 5, are welded closed or otherwise permanently plugged. New impingement cooling holes like 18 in FIGS. 2 and 3 are drilled, facilitated by partial or complete removal of the squealer tip. And a new squealer tip or squealer tip extension is attached, either as a separate casting which is attached by diffusion bonding, welding, or other technique, or as weld build up.

As various changes could be made in the above constructions without departing from the scope of the invention, it is intended that all matter contained in the above description or shown in the accompanying drawings shall be interpreted as illustrative and not in a limiting sense.

What is claimed is:

1. An airfoil for a gas turbine engine comprising:
a one-piece core body formed from a first superalloy comprising, upon original manufacture, an airfoil body, a cast-in integral tip cap, and a cast-in integral squealer tip portion;
a squealer tip extension formed from a second superalloy distinct from the first superalloy and bonded to the squealer tip portion; and
impingement coolant holes in the cast-in integral tip cap, which holes are angled such that an extended central axis thereof impinges on the squealer tip extension to direct coolant exiting said holes toward the squealer tip extension for impingement cooling thereof.

2. An airfoil for a gas turbine engine comprising:
a one-piece core body formed from a first superalloy comprising, upon original manufacture, an airfoil body, a cast-in integral tip cap, and a cast-in integral squealer tip portion;
a squealer tip extension formed from a second superalloy distinct from the first superalloy and bonded to the squealer tip portion; and
impingement coolant holes in the cast-in integral tip cap, which holes are angled such that an extended central axis thereof impinges on the squealer tip extension to direct coolant exiting said holes toward the squealer tip extension for impingement cooling thereof.

3. An airfoil for a gas turbine engine comprising:
a one-piece core body formed from a first superalloy comprising, upon original manufacture, an airfoil body, and a cast-in integral tip cap; and
a squealer tip bonded to the core body upon original manufacture and having at least a portion thereof formed from a second superalloy distinct from the first superalloy, the second superalloy having greater resistance to high-temperature oxidation and corrosion than the first superalloy and comprising, by approximate weight percent, 0.1 to 0.15 C, 6.0 to 7.0 Cr, 0.01 to 0.022, 5.5 to 6.5 Al, 2.5 to 3.5 Re, 4.5 to 5.5 W, 1 to 2 Mo, 11 to 13 Co, 6 to 7 Ta, 1 to 2 Hf, and the balance Ni.

4. The airfoil of claim 3 wherein the squealer tip extension is bonded to a squealer tip portion formed integrally with the core body upon original manufacture.

5. The airfoil of claim 4 wherein the first superalloy comprises, by approximate nominal weight %, 0.1 C, 9 Cr, 2.5 Ti, 0.01 B, 4.8 Al, 7 W, 2.5 Mo, 10 Co, 3.5 Ta, 1.5 Hf.

6. The airfoil of claim 4 wherein the first superalloy comprises, by approximate weight %, 0.15 to 0.2 C, 13.5 to 14.5 Cr, 4.5 to 5.5 Ti, 0.01 to 0.02 B, 2.5 to 3.5 Al, 3.5 to 4.5 W, 3.5 to 4.5 Mo, 7.5 to 12.5 Co, and the balance Ni.

7. The airfoil of claim 3 wherein the first superalloy comprises, by approximate nominal weight %, 0.1 C, 9 Cr, 2.5 Ti, 0.01 B, 4.8 Al, 7 W, 2.5 Mo, 10 Co, 3.5 Ta, 1.5 Hf.

8. The airfoil of claim 3 wherein the first superalloy comprises, by approximate nominal weight %, 0.15 to 0.2 C, 13.5 to 14.5 Cr, 4.5 to 5.5 Ti, 0.01 to 0.02 B, 2.5 to 3.5 Al, 3.5 to 4.5 W, 3.5 to 4.5 Mo, 7.5 to 12.5 Co, and the balance Ni.

9. An airfoil for a gas turbine engine comprising:
a one-piece core body formed from a first superalloy comprising an airfoil body, an integral cast-in squealer tip portion, and an integral cast-in tip cap between the airfoil body and the integral cast-in squealer tip portion;
a squealer tip extension bonded to the squealer tip portion; and
coolant holes in the cast-in integral tip cap which holes are angled such that an extended central axis thereof impinges on the squealer tip extension to direct coolant exiting said holes toward the squealer tip extension for impingement cooling.

10. The airfoil of claim 9 wherein the squealer tip extension is formed from a same superalloy as the one-piece core body.

11. The airfoil of claim 9 wherein the squealer tip extension is formed from a second superalloy distinct from the first superalloy.

12. An airfoil for a gas turbine engine manufactured by a method comprising:
forming a one-piece core body comprising an airfoil body, an integral cast-in squealer tip portion, and a cast-in integral tip cap between the airfoil body and the integral cast-in squealer tip portion;
bonding a squealer tip extension to the squealer tip portion; and
drilling a coolant hole in the cast-in integral tip cap which coolant hole is angled such that an extended central axis thereof impinges on the squealer tip extension to direct coolant at the squealer tip extension to provide impingement cooling.

13. The airfoil of claim 12 wherein the method comprises drilling the coolant hole prior to the bonding of the squealer tip extension to the integral cast-in squealer tip portion.

14. A method for manufacturing a gas turbine engine airfoil of the type having an airfoil body, a tip cap having a film coolant hole therein, and a squealer tip, the method comprising:
forming a one-piece core body comprising an airfoil body, a cast-in integral squealer tip portion, and a cast-in integral tip cap between the airfoil body and the cast-in integral squealer tip portion;
bonding a squealer tip extension to the partial height squealer tip; and
drilling a coolant hole in the cast-in integral tip cap prior to bonding the squealer tip extension to the squealer tip portion, which coolant hole is angled such that an extended central axis thereof impinges on the squealer tip extension so as to direct coolant at the squealer tip extension for impingement cooling.

15. The method of claim 14 comprising forming the core body from a first superalloy and forming the squealer tip extension from a second superalloy distinct from the first superalloy.

16. The method of claim 14 comprising forming the squealer tip extension by welding build up onto the cast-in integral squealer tip portion.

17. The method of claim 14 wherein the squealer tip extension is formed prior to attachment thereof to the cast-in integral squealer tip portion and is attached thereto by metallurgical bonding.

18. A method for repairing a gas turbine engine airfoil of the type having an airfoil body, a tip cap on the airfoil body, and a squealer tip on the tip cap, the method comprising:
removing at least a portion of the squealer tip to provide a line of sight above all remaining portions of the airfoil for drilling angled impingement cooling holes in the tip cap;
drilling an impingement coolant hole in the tip cap on the airfoil body which coolant hole is angled such that an extended central axis thereof impinges on the squealer tip extension after subsequent replacement thereof so as to provide impingement cooling; and
replacing said at least a portion of the squealer tip.

19. The method of claim 18 wherein the gas turbine engine has a film coolant hole in the tip cap prior to repair, the method comprising plugging the film coolant hole.

20. The method of claim 19 comprising plugging the film coolant hole prior to the drilling of the impingement coolant hole.

21. The method of claim 18 wherein the replacing comprises building up by welding.

22. The method of claim 21 wherein the replacing comprises building up by welding with a second superalloy distinct from a first superalloy from which the airfoil is formed.

* * * * *

UNITED STATES PATENT AND TRADEMARK OFFICE
CERTIFICATE OF CORRECTION

PATENT NO.     : 6,558,119 B2
DATED          : May 6, 2003
INVENTOR(S)    : Ching-Pang Lee et al.

It is certified that error appears in the above-identified patent and that said Letters Patent is hereby corrected as shown below:

<u>Title page,</u>
Item [74], *Attorney, Agent, or Firm,* should read -- William Scott Andes; Senniger, Powers, Leavitt & Roedel --.

Signed and Sealed this

Second Day of September, 2003

JAMES E. ROGAN
*Director of the United States Patent and Trademark Office*